CHARLES P. O'REGAN
INVENTOR.

BY
ATTORNEY

May 28, 1968   C. P. O'REGAN   3,385,984
VARIABLE RELUCTANCE STEPPER MOTOR DAMPER
Filed March 29, 1965                    2 Sheets-Sheet 2

CHARLES P. O'REGAN
INVENTOR.

BY
*Francis L. Masselle*

ATTORNEY

United States Patent Office 3,385,984
Patented May 28, 1968

3,385,984
VARIABLE RELUCTANCE STEPPER MOTOR DAMPER
Charles P. O'Regan, Bronx, N.Y., assignor to General Precision Inc., Little Falls, N.J., a corporation of Delaware
Filed Mar. 29, 1965, Ser. No. 443,278
7 Claims. (Cl. 310—49)

ABSTRACT OF THE DISCLOSURE

The invention relates to damping stepper motors. Damping is provided by magnetic drag between the rotor and the stator. A magnetic field, in addition to the magnetic field which actually causes the stepping, is generated between the rotor and the stator to provide the desired damping. In one aspect the magnetic field providing the damping is generated by additional stator windings. In another aspect, it is provided by applying a bias current to the stator windings used in the stepping. In a third aspect, the magnetic properties of the rotor are used to provide the magnetic damping. In a fourth aspect, the sequence of energization of the stator windings is used to provide the desired damping.

---

This invention relates to the damping of stepping motors and more particularly to a system for providing a magnetic drag on the rotor of a stepping motor to provide the desired damping.

When stepping motors are operated at certain high stepping rates their operation becomes erratic. This erratic operation is due to the fact that the rotor of the stepping motor in stopping at a position after a step oscillates back and forth about this position. If the stepping rate is such that the next step of the stepping motor coincides with a major peak of the oscillation of the rotor about the position at which it is stopping, the erratic action will occur. The stepping rates at which the steps coincide with the major oscillation peaks are referred to as resonant stepping rates. The resonant stepping rates vary in frequency with the inertia of the rotor and its load and with the voltage magnitude applied to the stepping motor to effect the stepping action. This erratic operation can be avoided by not operating at the resonant stepping rates, that is by operating the motor at stepping rates either substantially above or substantially below the resonant stepping rates. Such avoidance of the problem however puts severe limitations on the applications in which the stepping motor can be used.

Prior to the present invention viscous coupled inertia dampers have been used in an attempt to overcome the problem of erratic operation at the resonant stepping rates. Although such viscous coupled inertia dampers are effective under starting conditions, they have no effect in erasing unstable running speeds when the coupled inertia attains synchronism with the shaft speed. Moreover when the inertia becomes effectively direct coupled it increases the problem of instability. In addition, such viscous coupled inertia dampers increase the size and weight of the stepping motor and increase the inertia of the rotor of the stepping motor. Moreover, such viscous dampers have a damping constant which is inversely proportional to the temperature and this characteristic is undesirable in some applications. Furthermore, in viscous damping, the damping increases with speed. In the stepping motor the torque declines with speed. Hence at the top stepping rate where the developed torque is the least, the barely needed damping is the greatest and as a result the top stepping rate is severely restricted.

These disadvantages are overcome in accordance with the present invention in which damping is provided by magnetic drag between the rotor and the stator. A magnetic field, in addition to the magnetic field which actually causes the stepping, is generated between the rotor and the stator to provide the desired damping. In one embodiment of the invention the magnetic field providing the damping is generated by additional stator windings. In another embodiment of the invention it is provided by applying a bias current to the stator windings used in the stepping. In a third embodiment of the invention the magnetic properties of the rotor are used to provide the magnetic damping. In a fourth embodiment, the sequence of energization of the stator windings is used to provide the desired damping.

Because the damping is provided magnetically, increased damping is obtained without substantially increasing the weight or size of the stepping motor and without adding to the inertia of the rotor of the stepping motor. Moreover the damping is effective to erase unstable running speeds as well as under starting conditions. In addition the damping does not increase with speed and thus is not greatest when it is needed least so that the damping system of the present invention permits higher stepping rates to be achieved.

Accordingly an object of the present invention is to provide an improved damping system for eliminating the erratic operation of stepping motors at resonant stepping rates.

Another object of the present invention is to provide a damping system in a stepping motor without substantially increasing the weight or size of the stepping motor.

Still a further object of the present invention is to provide a damping system for a stepping motor without increasing the inertia of the rotor of the motor.

A still further object of the present invention is to provide an improved damping system in a stepping motor to eliminate the erratic operation of the stepping motor at resonant stepping rates, which damping system is effective to erase unstable running speeds as well as under starting conditions.

Further objects and advantages of the present invention will become readily apparent as the following detailed description of the invention unfolds and when taken in conjunction with the drawings, wherein:

FIGURE 1 schematically illustrates a stepping motor of the type to which the present invention applies;

Figure 1:
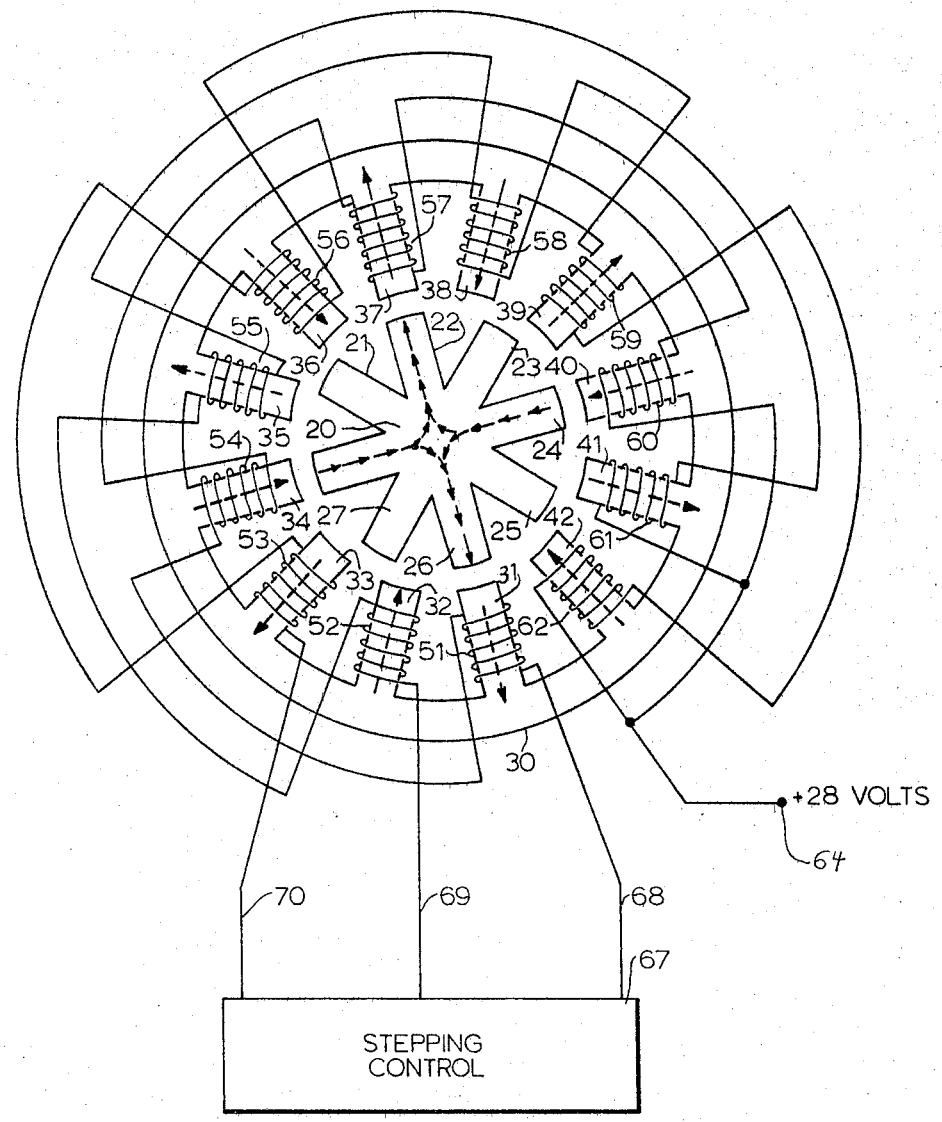

The schematic illustration of FIGURE 1 shows the general construction of the stator and rotor and schematically illustrates how the stator windings are wound on the stator. As shown in FIG. 1 the rotor, which is designated by the reference number 20, has eight radially extending poles 21–28 evenly distributed about the axis of the rotor. The rotor comprises a stack of laminations made of magnetically permeable material of low permanence such as soft iron. The stator which is designated by the reference number 30 comprises a ring shaped member surrounding the rotor and has 12 poles 31–42 evenly distributed about the axis of the rotor and extending radially toward the rotor. The stator like the rotor comprises a stack of laminations made of magnetically permeable material of low permanence. The poles of the stator 31–42 have coils 51–62 respectively wound thereon. Coils wound on the stator poles which are displaced from each other by 90° are connected in series between a source of +28 volts applied at a terminal 64 and a stepping control 67. Thus the coils 51, 54, 57 and 60 are connected in series between terminal 64 and a conductor 68 connected to the stepping control 67, the coils 52, 55, 58 and 61 are connected in series between terminal 64 and a conductor 69 connected to the stepping control 67, and the coils 53, 56, 59 and 62 are connected in series between terminal 64 and a conductor 70 connected to the stepping control 67. These connections can be more easily followed in the simplified circuit diagram of FIG. 2. The stepping control 67 sequentially grounds the conductors 68, 69 and 70 cyclically repeating the sequence to effect stepping action. When the conductor 68 is grounded current will flow through the coils 51, 54, 57 and 60. The coils 51, 54, 57 and 60 are poled so that when the stepping control 67 applies a ground to conductor 68 the poles 31 and 37 become south poles and the poles 34 and 40 become north poles. When the stepping control grounds conductor 69, current will flow through the coils 52, 55, 58 and 61, which are poled so that the poles 32 and 38 become north poles and the poles 35 and 41 become south poles. Likewise, when the stepping control 67 applies a ground to conductor 70, current will flow through the coils 53, 56, 59 and 62 which are poled so that the poles 33 and 39 become south poles and the poles 36 and 42 become north poles. The arrows on the poles in FIGURE 1 indicate the direction of the flux generated when the coils of the poles are energized by current flowing from the +28 volt source applied at terminal 64 to the stepping control 67. When current is caused to flow through one set of series connected coils by the stepping control 67 applying a ground to one of the conductors 68–70, the rotor 20 will rotate to line its poles up with the stator poles on which the set of energized coils are wound. For example when the stepping control applies ground to conductor 68, the coils 51, 54, 57 and 60 will be energized and the rotor 20 will assume the position as shown in FIGURE 1 with four of its poles lined up with the poles 31, 34, 37 and 40. The pattern of flux flowing through the rotor will be as illustrated by the arrows in the rotor 20. If the stepping control then next grounds the conductor 69, the set of coils 52, 55, 58 and 61 will be energized and the rotor will step in a counter-clockwise direction to line up its poles 27, 21, 23 and 25 with the poles 32, 35, 38 and 41 respectively. The stepping motor thus steps 15°. If the stepping control 67 then grounds the conductor 70, the set of coils 53, 56, 59 and 62 will be energized and the rotor will step 15° in a counter-clockwise direction to have its poles 28, 22, 24 and 26 line up with the stator poles 33, 36, 39 and 42 respectively. Then when the stepping control 67 again grounds conductor 68 to again energize the set of coils 51, 54, 57 and 60, the rotor will step 15° in a counter-clockwise direction to have its poles 27, 21, 23 and 25 line up with the stator poles 31, 34, 37 and 40 respectively. In this manner by grounding the conductors 68–70 cyclically in this sequence the rotor can be continuously stepped in a counter-clockwise direction in 15° increments. By reversing the sequence, that is by grounding the conductors in the sequence 68, 70, 69, 68, etc., the rotor 20 can be stepped in the opposite direction in 15° increments.

Figure 2:
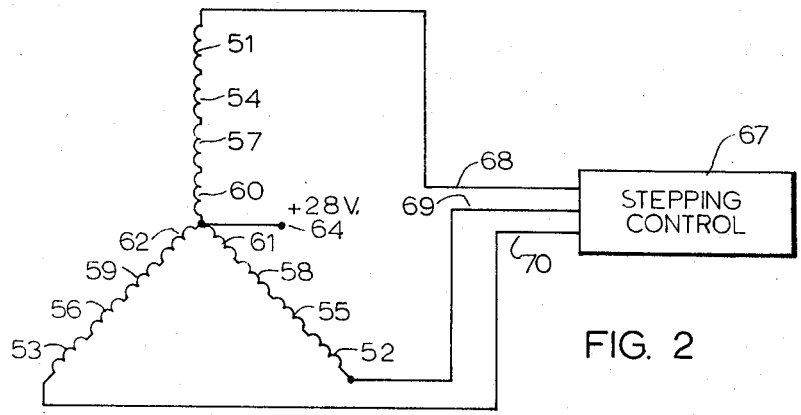
FIGURE 2 is a simplified circuit diagram illustrating how the windings of the stepping motor of FIGURE 1 are connected.
Figure 3:
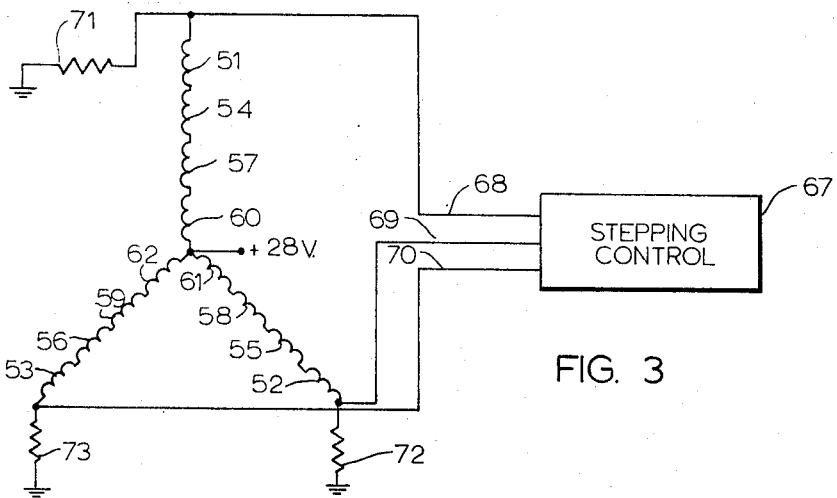
FIGURE 3 is a simplified circuit diagram of a stepping motor with a damping system in accordance with one embodiment of the present invention.

FIGURE 3 illustrates the circuit of a stepping motor in the simplified form of FIG. 2 incorporating a magnetic damping system in accordance with one embodiment of the invention. As shown in FIG. 3, three resistors 71, 72 and 73 are connected between ground and the conductors 68, 69 and 70 respectively. Accordingly, current will continuously flow through each of the three sets of series connected coils and through the resistors 71, 72 and 73 to ground. Accordingly the coils 51, 54, 57 and 60 will generate a relatively low magnetic field determined by the value of the resistor 71 when the conductor 68 is not grounded. Similarly the set of coils 52, 55, 58 and 61 and the set of coils 53, 56, 59 and 62 will generate relatively low magnetic fields when the conductors 69 and 70 respectively are not grounded. The set of coils which are connected to the grounded conductor will generate a relatively high magnetic field and effect stepping action by causing the poles of the rotor to line up with the stator poles on which these coils are wound in the same manner as described with reference to FIGS. 1 and 2. However, the relatively low magnetic field provided by the remaining coils will exert a magnetic drag on the rotor opposing its rotation and thus provide damping, which will be of the coulomb type. This damping will eliminate the erratic operation at resonate stepping frequencies.

Figure 4:
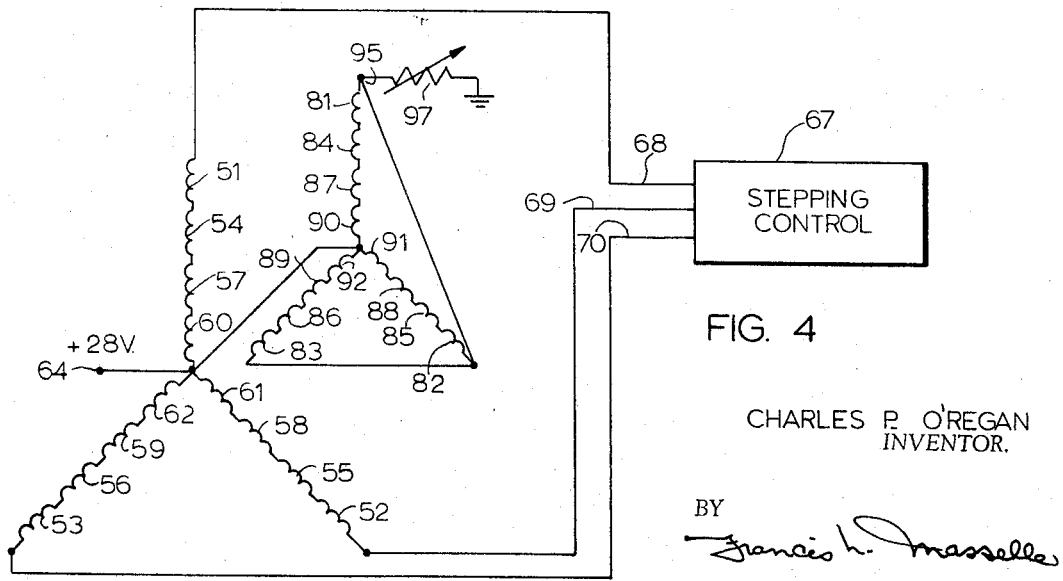
FIGURE 4 is a simplified circuit diagram of a stepping motor with a damping system in accordance with another embodiment of the present invention.

In the embodiment illustrated in FIG. 4 an additional coil is wound on each of the stator poles. These additional coils are numbered 81–92 and are wound on the stator poles 31–42 respectively. FIG. 4 illustrates how these additional coils are connected. The coils 81, 84, 87 and 90 are connected in series between a junction point 95 and the +28 volts applied at terminal 64. The coils 82, 85, 88 and 91 are also connected in series between the junction point 95 and the +28 volts applied at terminal 64. Similarly the coils 83, 86, 89 and 92 are connected in series between the junction point 95 and the +28 volts applied at terminal 64. A variable resistor 97 connects the junction point 95 to ground. Accordingly, current will flow from the +28 volt source applied at terminal 64 through the set of coils 81, 84, 87 and 90, the set of coils 82, 85, 88 and 91, and the set of coils 83, 86, 89 and 92 in parallel and then through the variable resistor 97 to ground. The coils 81–92 are poled so that the current flowing through them from the source 64 generates flux in the stator poles 31 through 42 in the same direction that flux is generated by the coils 51–60. Accordingly the flux generated by the coils 81–92 will apply a magnetic drag on the rotor to provide damping of the coulomb type.

In accordance with another embodiment of the invention the desired damping is provided by using a rotor made of a material of substantial magnetic permanence such as steel instead of using a material of low magnetic permanence such as soft iron. Because a material of substantial permanence is used, residual magnestim is produced in the rotor in response to the rotor lining up with energized stator poles. This residual magnetism will provide a magnetic drag on the rotor when the rotor is stepped to the next position. This magnetic drag will provide the desired damping to eliminate the erratic operation of the stepping motor at resonate stepping frequencies. This embodiment has a disadvantage in that the damping is relatively constant and therefore a stepping motor having such a rotor is suitable only for a limited load range. Different load ranges can be provided by means of rotors of differing magnetic permanence. This embodiment has the advantage of not requiring any electrical power for the damping.

In accordance with still another embodiment of the invention the desired magnetic damping is provided by the sequence in which the stepping control 67 applies and removes ground from the conductors 68, 69 and 70. In accordance with this embodiment the stepping control acts to apply ground to two of the conductors 68, 69 and 70 simultaneously leaving one of the conductors ungrounded. When two of the conductors 68, 69 and 70 are grounded, the rotor will position four of its poles opposite the slots between adjacent stator poles on which energized coils are wound. Stepping action is obtained by sequentially and cyclically changing the one of the three conductors 68, 69 and 70 which is not grounded. For example if the conductors 69 and 70 are grounded and the conductor 68 is not grounded, the rotor will position itself in the position shown in FIG. 1 with four of its rotor poles opposite the slots between the adjacent pairs of stator poles 32 and 33, 35 and 36, 38 and 39, and 41 and 42, on which are wound energized coils. To step the motor 15° in a counter-clockwise direction the conductor 68 is grounded and the ground is removed from the conductor 69 while continuously maintaining the ground applied to the conductor 70. Thus, the coils 51, 53, 54, 56, 57, 59, 60 and 62 will be energized. Accordingly the rotor 20 will rotate 15° in a counter-clockwise direction to line up its poles 22, 24, 26 and 28 with the slots between adjacent stator poles on which energized coils are wound. The rotor pole 26 will then be between the stator poles 31 and 42. To step the rotor another 15° the ground is removed from the conductor 70 and ground is applied to the conductor 69 while maintaining the ground applied to the conductor 68. The rotor will then move to a position in which its pole 27 is lined up between the stator poles 31 and 32. To step the rotor another 15° the ground is removed from the conductor 68 and applied to the conductor 70 while maintaining the ground applied to the conductor 69. The rotor 20 will then move to line its pole 26 up between the stator poles 41 and 42. In this manner the rotor can be continuously stepped in 15° increments. To step the rotor in the opposite direction the sequence in which the conductors 68-70 become ungrounded is reversed. Because power is continuously applied to one of the three sets of coils, while power is being transferred from the second set to the third set in causing the motor to step one increment, the flux produced by the continuously energized set of coils acts as a brake on the rotor during the stepping operation and thus provides the desired magnetic damping. The damping provided by this embodiment has the advantage in that in the damping torque is a constant percentage of the developed torque causing the stepping action. This feature is desirable because the amount of damping torque needed changes in direct proportion with the developed torque.

Each of the above-mentioned embodiments has the advantage that the damping is obtained without adding any inertia to the rotor. Accordingly the rotor can be operated at significantly higher stepping rates than stepping motors which are damped by the systems of the prior art. Moreover the damping is achieved without significantly adding to the size or weight of the stepping motor. In addition to these advantages the damping provided by the system of the present invention has infinite resolution, which cannot be obtained readily by any of the mechanical means of the prior art.

The above description is of preferred embodiments of the invention and many modifications may be made thereto without departing from the spirit and scope of the invention, which is defined in the appended claims.

The embodiments of the invention in which an exclusive property or privilege is claimed are defined as follows:

1. In a stepping motor having a rotor of magnetically permeable material, a stator of magnetically permeable material, first, second and third winding circuits on said stator distributed about the axis of said rotor, and stepping control means to energize said winding circuits to apply flux to said rotor in a manner to cause said rotor to rotate in predetermined increments, the improvement wehrein said motor has magnetic damping means which include said first, second and third winding circuits and means to apply a bias current to said first, second and third winding circuits so as to generate damping flux between said rotor and said stator in a manner to apply a force to said rotor to oppose the rotation of said rotor thereby providing damping for the incremental rotation of said rotor.

2. A stepping motor as recited in claim 1 wherein said magnetic damping means comprises an additional winding circuit on said stator and means to apply a bias current to said additional winding circuit.

3. A stepping motor as recited in claim 1 wherein said magnetic damping means comprises said rotor, said rotor being made of material of substantial magnetic permanence so that said rotor produces said magnetic damping flux.

4. A stepping motor as recited in claim 1 wherein said magnetic damping means also includes said stepping control means, said stepping control means comprising means to energize different pairs of said winding circuits in sequence.

5. A stepping motor comprising a rotor of magnetically permeable material having a plurality of radially extending poles distributed about the axis thereof, a stator of magnetically permeable material surrounding said rotor having a plurality of poles extending radially toward the axis of said rotor and distributed about the axis of said rotor, a plurality of coils wound on said stator, means to energize different combinations of said coils in sequence to generate flux between said rotor and said stator to cause said rotor to rotate in predetermeind increments, and means to apply a bias current to all of said coils to generate a damping flux between said rotor and said stator to oppose the rotation of said rotor to thereby provide damping of the incremental rotation of said rotor.

6. A stepping motor comprising a rotor of magnetically permeable material having a plurality of radially extending poles distributed about the axis thereof, a stator of magnetically permeable material surounding said rotor having a plurality of poles extending radially toward the axis of said rotor and distributed about the axis of said rotor, a plurality of coils wound on said stator, means to energize different combinations of said coils in sequence to generate flux between said rotor and said stator to cause said rotor to rotate in predetermined increments, a winding on said stator, and circuit means to apply a bias current to said winding, said winding being arranged to generate flux between said stator and said rotor to apply a forec to said rotor opposing the rotation of said rotor thereby providing damping for the incremental rotation of said rotor.

7. A stepping motor comprising a rotor of magnetically permeable material having substantial magnetic permanence, said rotor having a plurality of radially extending poles distributed about the axis thereof, a stator of magnetically permeable material surounding said rotor and having a plurality of poles extending radially toward the axis of said rotor and distributed about the axis of said rotor, a plurality of coils wound on said stator, and means to energize different combinations of said coils in sequence to generate flux between said rotor and said stator to cause said rotor to rotate in predetermined increments, said rotor because of having substantial magnetic permanence generating flux between said rotor and said stator to apply a force to said rotor to oppose the rotation of said rotor thereby providing damping for the incremental rotation of said rotor.

References Cited

UNITED STATES PATENTS

| | | | |
|---|---|---|---|
| 2,677,090 | 4/1954 | Flemming | 310—49 X |
| 3,024,399 | 3/1962 | Valentino | 310—49 X |
| 3,239,738 | 3/1966 | Welch | 310—49 X |
| 3,287,569 | 11/1966 | Carney | 310—49 X |
| 3,344,325 | 9/1967 | Sklaroff | 318—138 |

MILTON O. HIRSHFIELD, *Primary Examiner.*

G. NUNEZ, *Assistant Examiner.*